United States Patent
Jin et al.

(10) Patent No.: US 9,928,375 B2
(45) Date of Patent: Mar. 27, 2018

(54) MITIGATION OF DATA LEAKAGE IN A MULTI-SITE COMPUTING INFRASTRUCTURE

(75) Inventors: Hongxia Jin, San Jose, CA (US); Qihua Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 13/158,893

(22) Filed: Jun. 13, 2011

(65) Prior Publication Data
US 2012/0317135 A1    Dec. 13, 2012

(51) Int. Cl.
G06F 17/30    (2006.01)
G06F 21/62    (2013.01)

(52) U.S. Cl.
CPC .... G06F 21/6218 (2013.01); G06F 17/30165 (2013.01)

(58) Field of Classification Search
CPC .................................................. G06F 17/20165
See application file for complete search history.

(56) References Cited

U.S. PATENT DOCUMENTS

| | | | |
|---|---|---|---|
| 6,662,198 B2 * | 12/2003 | Satyanarayanan et al. | |
| 7,574,488 B2 * | 8/2009 | Matsubara | 709/219 |
| 7,853,656 B2 * | 12/2010 | Yach et al. | 709/206 |
| 8,417,555 B2 * | 4/2013 | Bagheri et al. | 705/7.22 |
| 8,438,178 B2 * | 5/2013 | Ismalon | 707/765 |
| 8,473,493 B2 * | 6/2013 | Jin et al. | 707/736 |
| 2002/0087632 A1 * | 7/2002 | Keskar | 709/204 |
| 2003/0158747 A1 * | 8/2003 | Beton et al. | 705/1 |
| 2005/0114672 A1 * | 5/2005 | Duncan et al. | 713/182 |
| 2006/0248573 A1 * | 11/2006 | Pannu et al. | 726/1 |
| 2008/0250450 A1 * | 10/2008 | Larner et al. | 725/34 |
| 2009/0178131 A1 | 7/2009 | Hudis et al. | |
| 2009/0234876 A1 * | 9/2009 | Schigel et al. | 707/102 |
| 2010/0229212 A1 * | 9/2010 | Liu et al. | 725/109 |

(Continued)

FOREIGN PATENT DOCUMENTS

EP    1524611 A2 *    4/2005    ....... G06F 17/30702
JP    2011028702        2/2011

(Continued)

OTHER PUBLICATIONS

Glance et al., "Making Recommender Systems Work for Organizations", Xerox Research Centre Europe, 1999 [retrieved on Oct. 31, 2012]. Retrieved from the Internet <URL: http://reference.kfupm.edu.sa/content/m/a/making_recommender_systems_work_for_orga_103260.pdf>.*

(Continued)

Primary Examiner — Tyler Torgrimson
(74) Attorney, Agent, or Firm — Lieberman & Brandsdorfer, LLC

(57) ABSTRACT

Embodiments of the invention relate to a method, system, and computer program product to dynamically mitigate data leakage in a file sharing environment. Mandatory access control policies are provided to address and maintain restrictions on file sharing both with respect to security rules of an organization and restrictions pertaining to discretionary sharing decisions. In addition, suggestions for potential recipients for file sharing are supported, as well as examination of abnormal recipients in response to the discretionary sharing decisions.

20 Claims, 11 Drawing Sheets

(56) References Cited

U.S. PATENT DOCUMENTS

| | | | |
|---|---|---|---|
| 2010/0250547 A1* | 9/2010 | Grefenstette et al. | 707/740 |
| 2011/0213785 A1* | 9/2011 | Kristiansson et al. | 707/748 |
| 2011/0314516 A1* | 12/2011 | Li et al. | 726/3 |
| 2012/0016885 A1* | 1/2012 | Jin et al. | 707/748 |
| 2012/0096158 A1* | 4/2012 | Astete et al. | 709/225 |

FOREIGN PATENT DOCUMENTS

| | | |
|---|---|---|
| JP | 2011048661 | 3/2011 |
| WO | WO 2010072614 A1 * | 7/2010 |

OTHER PUBLICATIONS

Team Collaboration with Data Leak Prevention Solution, Fortressware 2010.

Takebayashi, T. et al., Data Loss Prevention Technologies, Jan. 2010.

Squicciarini et al., Preventing Information Leakage From Indexing in the Cloud, IEEE 3rd International Conference on Cloud Computing, 2010.

Huang et al., ID Management Among Clouds, First International Conference on Future Information Networks, 2009.

* cited by examiner

MITIGATION OF DATA LEAKAGE IN A MULTI-SITE COMPUTING INFRASTRUCTURE

BACKGROUND

This invention relates to dynamic assessment of application sharing in a shared pool of configurable computing resources. More specifically, the invention relates to mitigation of application sharing to unwarranted users in the shared pool.

Cloud computing is a model of service delivery for enabling convenient, on-demand network access to a shared pool of configurable computer resources, e.g. networks, network bandwidth, servers, processing, memory, storage, applications, virtual machines, and services, that can be rapidly provisioned and released with minimal management effort or interaction with a provider of service. One of the characteristics of cloud computing infrastructure is that applications can be launched from a plurality of locations and shared with multiple users. More specifically, the cloud computing infrastructure offers a collaboration system that may serve multiple clients from different organizations. An organization may create accounts for employees, who can then communicate and share files with other system users, including users outside of the organization. However, such collaboration brings a security concern with respect to data leakage, and especially inadvertent mistakes on file sharing. More specifically, prior to collaboration across the cloud infrastructure, collaboration systems include organizational boundaries to provide a social and technical barrier to mitigate inappropriate file sharing.

Information sharing is a popular activity in a collaboration system. However, the collaboration system is not static. Users in the system change, the roles of the users in the system are subject to changes, etc. In other words, the collaboration takes places in a system that is dynamic. As such, a security system must be employed within the system to ensure and support the dynamic characteristics of the collaboration system.

BRIEF SUMMARY

This invention comprises a method, system, and article for mitigation of data leakage in a file sharing environment.

In one aspect, a method is provided for managing file collaboration in a file sharing environment. For an entity owning a file, a first tier of mandatory access control policies to the data is specified. The mandatory access control policies include both a maximum sharing scope for certain types of files, and a restriction around one or more discretionary sharing decisions. The restriction policies are made by users of a shared pool of resources in the file sharing environment, with the policies focused on preventing leakage of data while maintaining a flexible discretionary control mechanism. One or more contacts of the entity are interactively recommended as a candidate for file sharing. In one embodiment, the interactive recommendation is based upon a keyword specified for the file and a current selected recipient. Similarly, in one embodiment, the profiles include past collaboration activities as a basis for recommendations of one or more recipients for a target file. A profile of the contact is periodically updated with use of new collaboration information. More specifically, recommendations for file sharing are dynamically adjusted based upon the updated contact profile.

In another aspect, a computer program product is delivered as a service through a network connection. The computer program product comprises a computer readable storage medium having computer readable program code embodied therewith. Computer readable program code is provided to specify a first tier of mandatory access control policies to data in an entity owning file sharing environment. The mandatory access control policies control both a maximum sharing scope of files having a specified characteristic and a restriction policy with respect to one or more discretionary sharing decisions instituted by a user. The mandatory access control policies are instituted to mitigate leakage prevention while enables a flexible discretionary control mechanism. Computer readable program code is provided to create attribute profiles for each entity contact in the file sharing environment. More specifically, the program code for created attribute profiles mines past collaboration activities and employs these past activities as a basis for a current recommendation of one or more possible recipients for a target file. Computer readable program code is also provided to periodically update the contact profiles with new collaboration information, and to provide dynamic adjustment of the recommendations based upon the updated contact profiles.

In a further aspect, a system is provided with tools to support collaboration of one or more files in a file sharing environment. An access manager is provided in communication with the file sharing environment to maintain a flexible discretionary control mechanism. More specifically, the access manager specifies a first tier of mandatory access control policies for an entity owning data in the file sharing environment. The mandatory access control policies control the following: maximum sharing scopes of certain types of files, and one or more coarse grained security boundaries around discretionary sharing decisions made by users. A profile manager is provided in communication with the access manager. The profile manager creates an attribute profile for each entity contact. A history manager is provided in communication with the profile manager. The history manager mines past collaboration activity as a basis for a current or future recommendation of a recipient for a target file. An update manager is provided in communication with the history manager. The update manager updates the contact profiles of an entity using new collaboration information, with the update addressed the contact profile created by the profile manager. To address the dynamic nature of the collaboration supported environment, an adjustment manager is provided in communication with the update manager. The adjustment manager dynamically adjusts recommendations for file sharing based upon the update contact profiles as supported by the update manager.

In an even further aspect, a method is provided to support collaboration in an entity owning file sharing environment. The service specifies a first tier of mandatory access control policies to data, with the mandatory access control policies established to control a maximum sharing scope of certain types of files and to place one or more restrictions around discretionary sharing decisions to prevent leakage of data while maintaining a flexible discretionary control mechanism. Attribute profiles are created for each entity contact. The created attribute profiles encompass past collaboration activities that have been mined as a basis for recommending a possible recipient for a target file. Contact profiles of the entity are updated using new collaboration information on a periodic basis. The service dynamically adjusts recommendations for file sharing based on the updated contact profiles.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
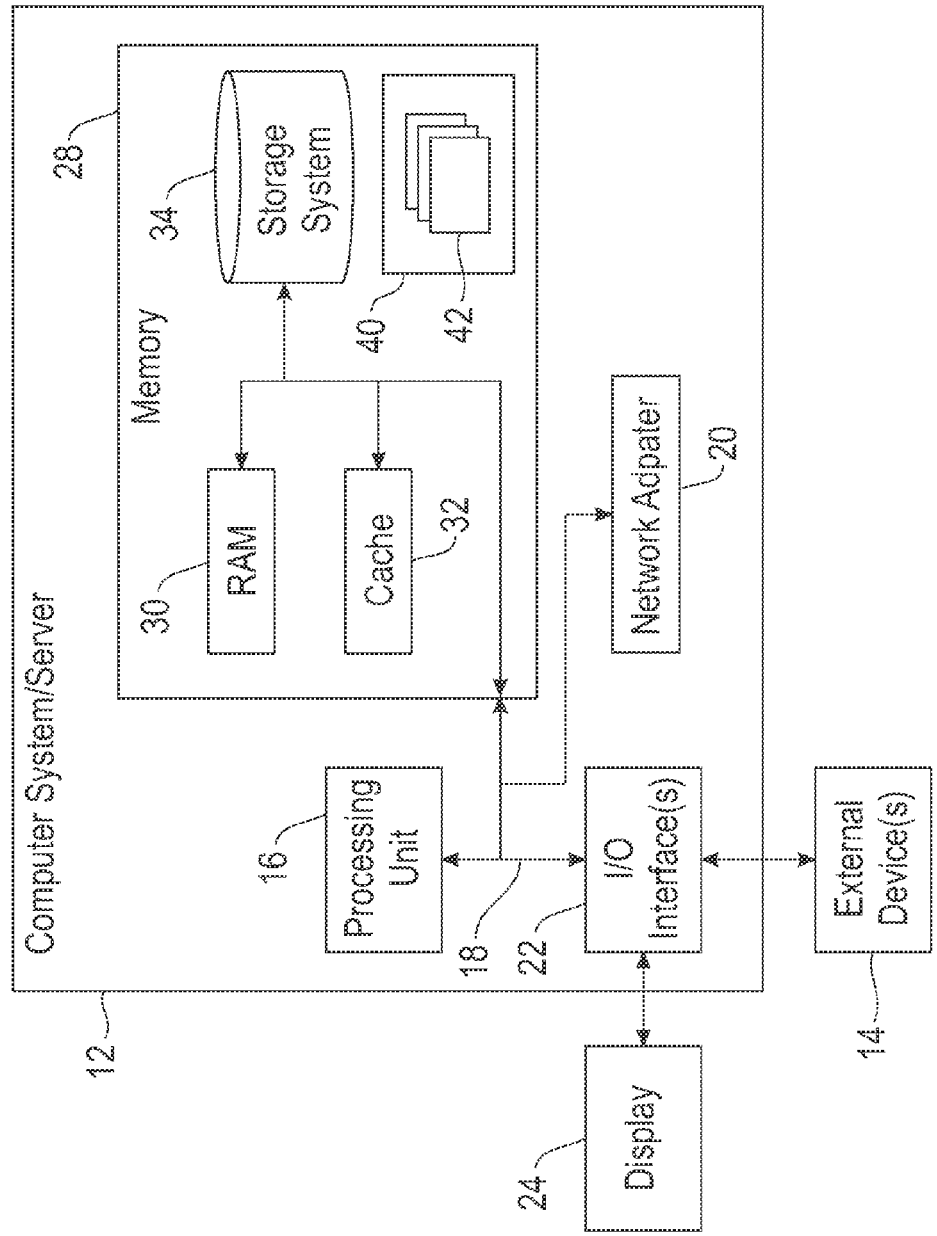
FIG. 1 depicts a cloud computing node according to an embodiment of the present invention.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of an application manager, a replication manager, a migration manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove. In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16). Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating systems, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14), such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output (I/O) interfaces (22). Still yet, computer system/server (12) can communicate with one or more networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
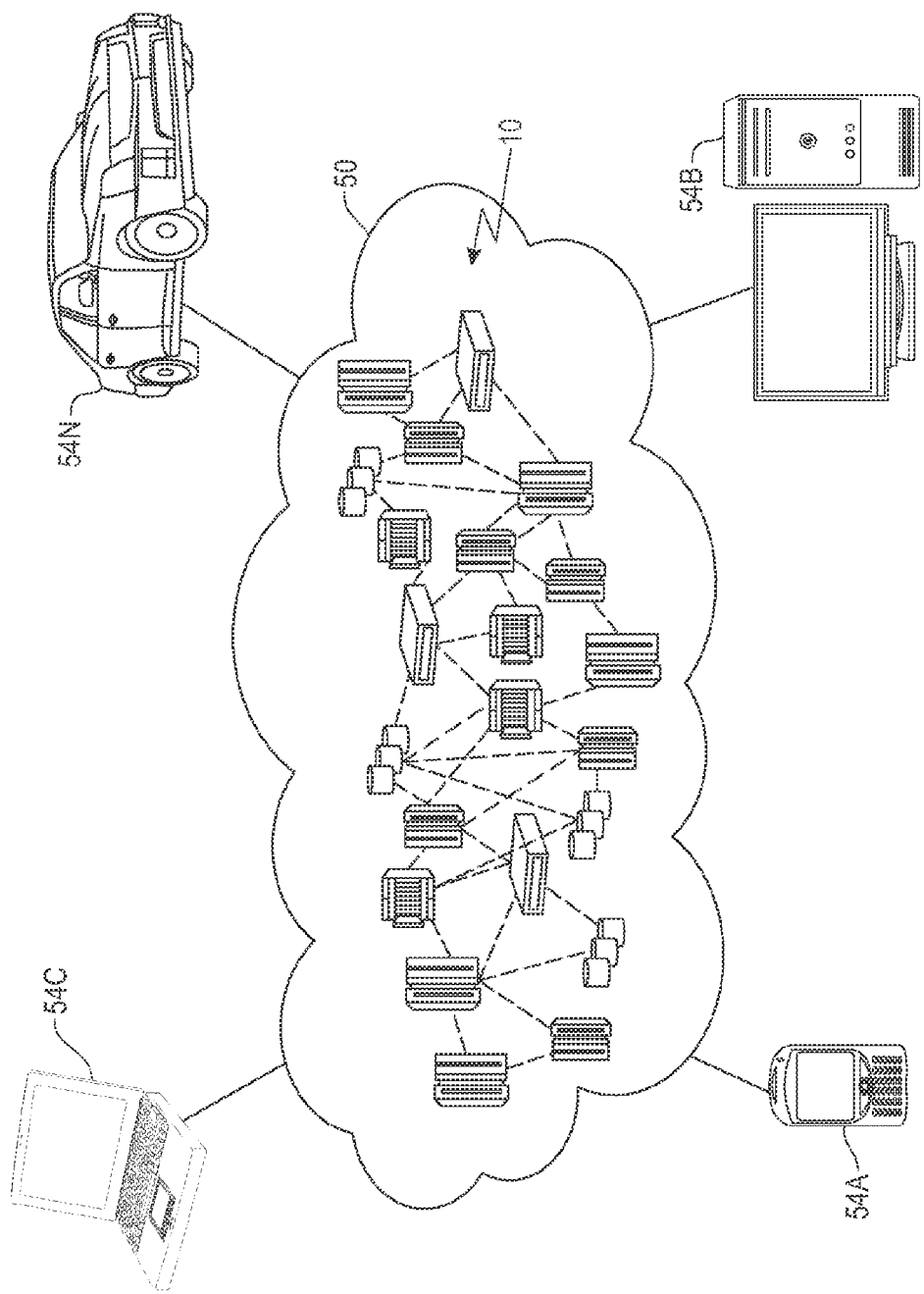
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A)-(54N) shown in FIG. 2 are intended to be illustrative only and that computing nodes (10) and cloud computing environment (50) can communicate with any type of computerized device over any type of network and/or network addressable connection (e.g., using a web browser).

Figure 3:
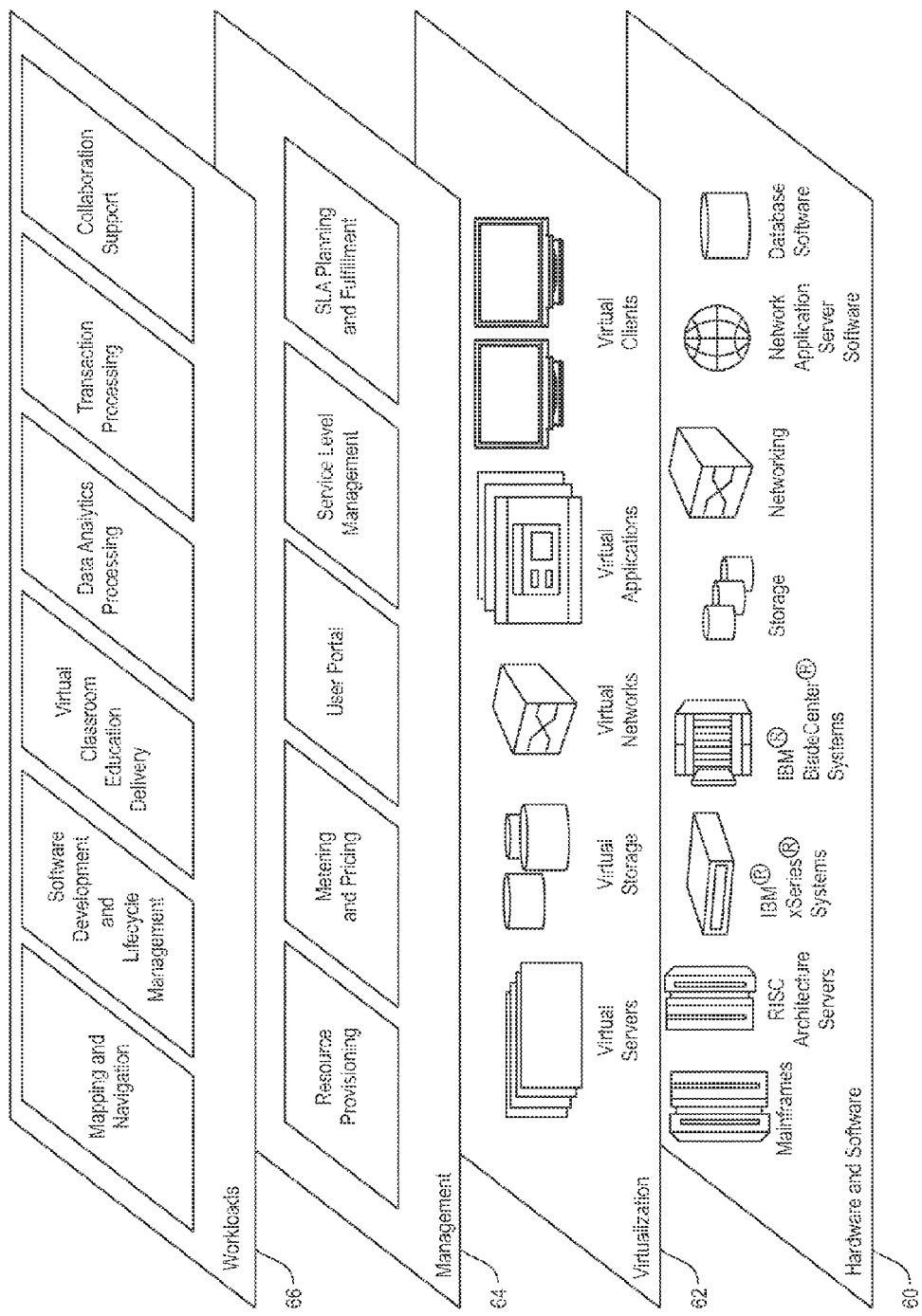
FIG. 3 depicts abstraction model layers according to an embodiment of the present invention.

Referring now to FIG. 3, a set of functional abstraction layers provided by cloud computing environment (50) (FIG. 2) is shown. It should be understood in advance that the components, layers, and functions shown in FIG. 3 are intended to be illustrative only and embodiments of the invention are not limited thereto. As depicted, the following layers and corresponding functions are provided: hardware and software layer (60), virtualization layer (62), management layer (64), and workload layer (66). The hardware and software layer (60) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers; virtual storage; virtual networks, including virtual private networks; virtual applications and operating systems; and virtual clients.

In one example, management layer (64) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer includes, but is not limited to: mapping and navigation; software development and lifecycle management; virtual classroom education delivery; data analytics processing; operation processing; and maintenance of data security to support collaboration within the cloud computing environment.

In the shared pool of configurable computer resources described herein, hereinafter referred to as a cloud computing environment, files may be shared among users within multiple data centers, also referred to herein as data sites. A series of mechanisms are provided within the shared pool to provide defense against information leakage, i.e. unauthorized user sharing of a file. These mechanisms include the following: mandatory access control (MAC) policies, an attribute based recipient recommender, and a tool to dynamically evaluate user input to detect file sharing errors. The MAC policies encode organization security rules and impose coarse-grained restrictions on discretionary decisions. The attribute based recipient recommender is employed to mitigate inappropriate file sharing by suggesting and prioritizing potential recipients for file sharing. The dynamic evaluation tool actively examines input and issues a warning in response to a detected recipient designated in the file sharing environment. Accordingly, together, these mechanisms provide multiple layers of defense to prevent unauthorized data leakage in a file sharing environment.

A collaboration system includes a set of organizations, O, registered users, U, and a set of subsystems, $S=\{s_1, \ldots s_m\}$. Each subsystem in a collaboration system offers a category of collaboration services. Examples of collaboration services include, but are not limited to, file sharing, online meetings, and collaborative workflows where users may contribute to a collaborative task that is divided into multiple steps. Users are generally identified in the collaboration system through a registered electronic mail, hereinafter email, address. A user's contacts are other uses in the shared pool of resources file sharing system who have direct or close social connections with the user. There are different ways for a user to acquire contacts in a collaboration system, including manually adding a contact to an address book, automatically adding a contact through collaboration activities, and pre-loading a contact from an organization directory. As described above, files are commonly shared in a collaboration system. A user who uploads a file to the collaboration system is the owner of the file, and is responsible for specifying any security labels and keywords to be associated with the uploaded file. In one embodiment, the uploaded file may contain a plurality of security labels.

Figure 4:
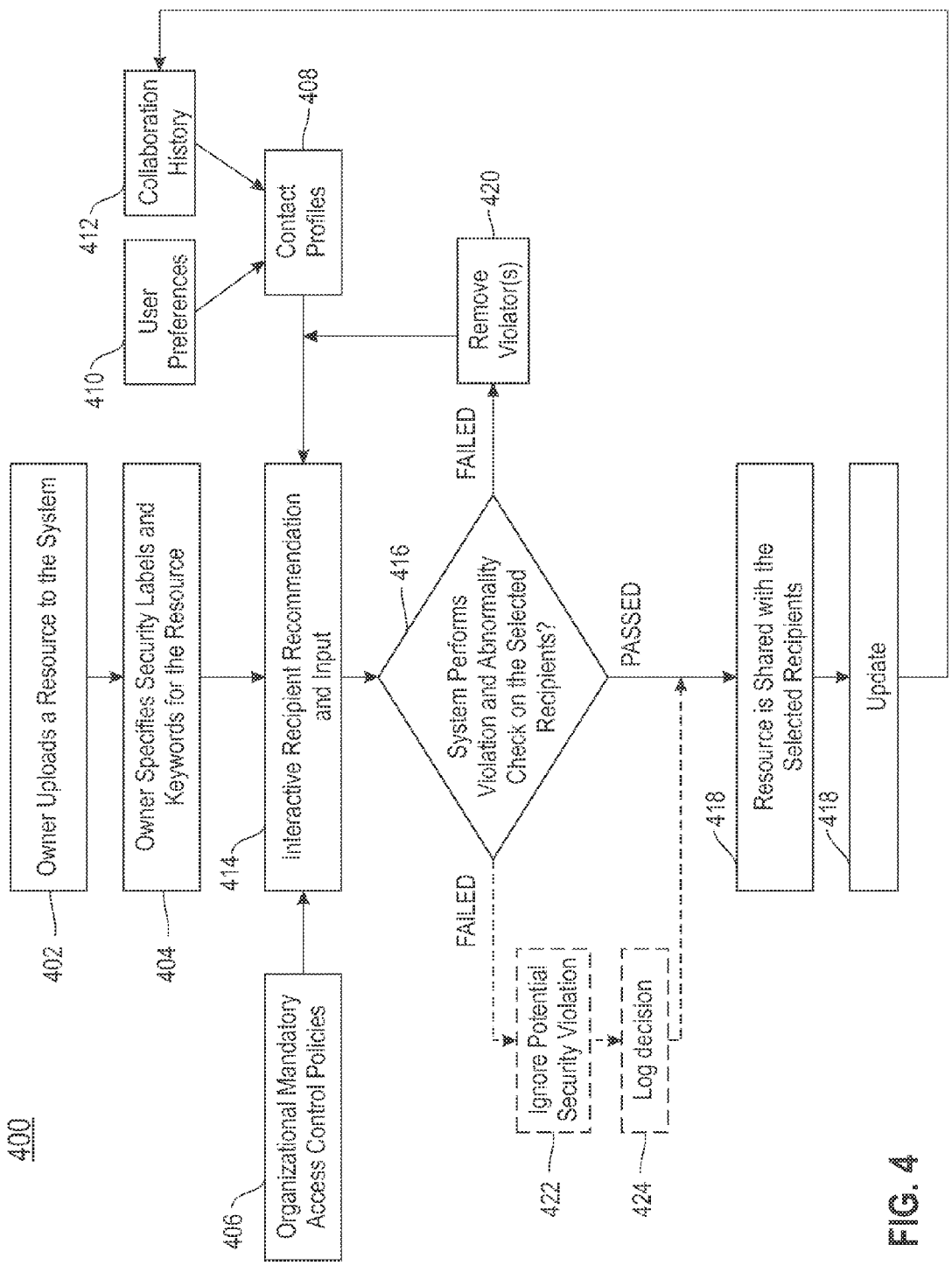
FIG. 4 depicts a flow chart illustrating functionality of the data leakage prevention manager.
Figure 5:
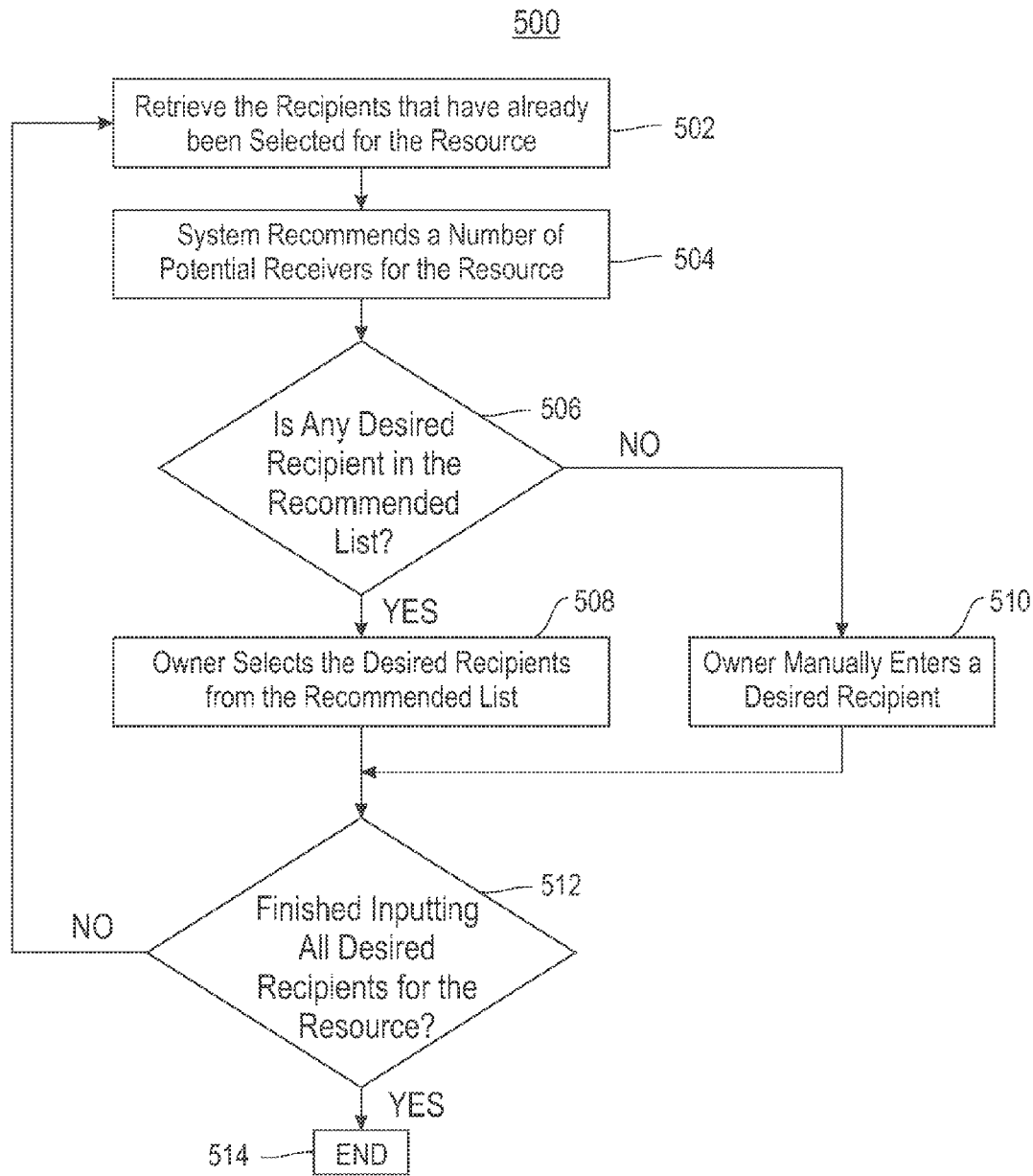
FIG. 5 depicts a flow chart illustrating interactively recommending recipients as well as inputting select recipients for the uploaded resource.

A central component to the collaboration system is a data leakage prevention manager to provide defense against information leakage through file sharing. FIG. 4 is a flow chart (400) illustrating the functionality of the data leakage prevention manager. As shown, an owner uploads a resource to the system (402) and specifies security labels and keywords for the uploaded resource (404). In a collaborative environment, the owner may designate a set of recipients to access the uploaded resource. However, the designation takes into account mandatory access control policies of one or more organizations represented within the system (406), contact profiles (408) as created through a combination of user preferences (410), and a collaboration history (412). Recipients for the uploaded resources are interactively determined (414). FIG. 5, as described below, illustrates the details of interactively recommending recipients as well as inputting select recipients for the uploaded resource.

Figure 7:
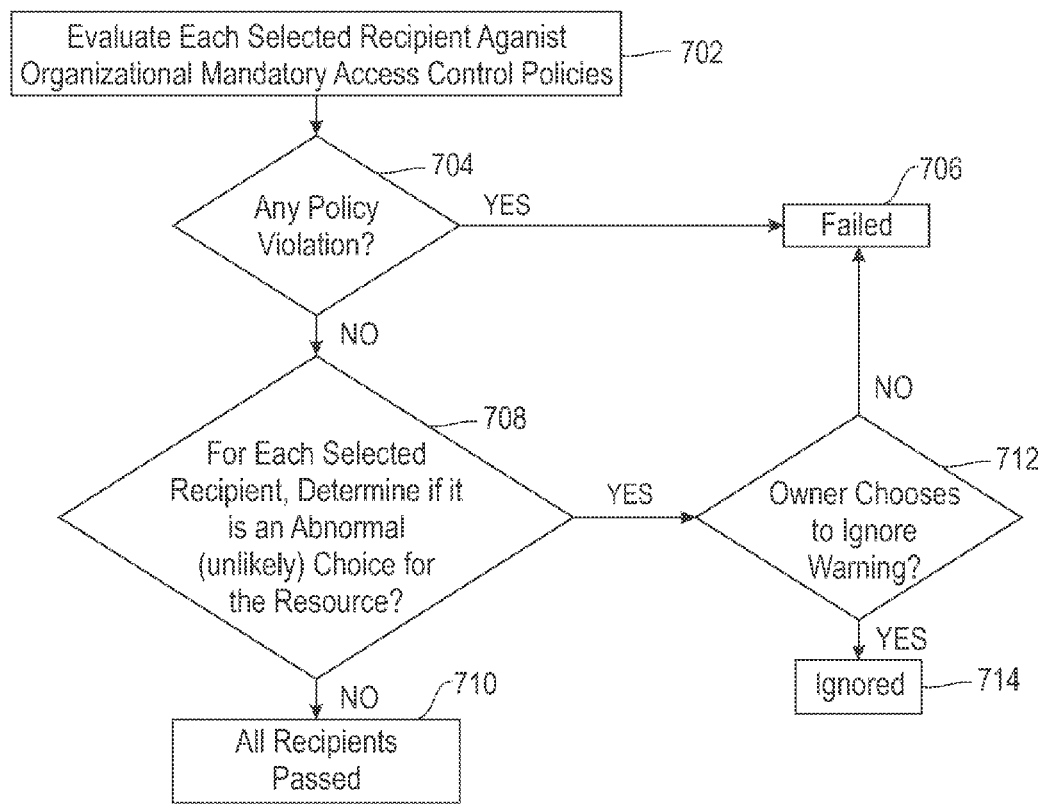
FIG. 7 depicts a flow chart illustrating evaluating a sharing violation together with an abnormality check.

Following step (414) a violation and abnormality check is performed on the recommended recipients to determine if any of the recommended recipients violate security protocols (416). FIG. 7, as described below, illustrates the details of the violation and abnormality check. If at step (416) it is determined that there is no security protocol violation, the resource is shared with the selected recipients (418). However, if at step (416) it is determined that there is a security protocol violation, the owner may remove the violator(s) (420) followed by a return to step (414), or the owner may ignore the potential security violation (422) followed by step (418). In one embodiment, the system may enter the owner's decision on ignoring potential security violation into a log (424). In addition to sharing the resource at step (418), the collaboration history is updated (426) to reflect the resource sharing, including the recipients identified for sharing the resource.

The following are the logical and mathematical elements of the mandatory policies. More specifically, a mandatory access control policy is represented as $\{\delta, O_q\}$, where $\delta$ is an application scope function that take a sharing instance as input and returns a Boolean value, and $O_q \subseteq O$ is the qualification scope of the policy. The application scope function determines the applicability of a mandatory access control policy to a sharing instant. The qualification scope defines a security boundary at the organization level as follows: to be qualified to receive the target file, a user must be affiliated with an organization in the qualification scope. The qualification scope functions to prevent applicable data from flowing out of the boundaries of organizations. Given a sharing instance, $\tau=\{u, U_a, f, t\}$ and a policy $p=\{\delta, O_q\}$, we say that $\tau$ violates p if and only if both of these conditions hold: $\delta(\tau)$ is true, and $\exists_{u' \in U_a}$ org $(u') \notin O_q$, where org (u') is an affiliated organization of u'. $\tau$ satisfies p if $\tau$ does not violate p. Similarly, the users $U_a$ are qualified for the file's identity f with regards to p if $\tau$ satisfies p. In one embodiment, not all the users in a qualified organization are authorized to share a target file. Authorization is performed discretionarily by the user who initiates the sharing. A mandatory access control policy only provides an upper bound on discretionary selections.

As shown in FIG. 4, recipient choices for an uploaded resource may be based on a variety of criteria, including mandatory access control policies of an organization within the collaboration system, user preferences, collaboration history, etc. FIG. 5 is a flow chart (500) illustrating a process for interactively recommending recipients as well as inputting select recipients for the uploaded resource. Initially, the recipients that have been previously selected for the resource are retrieved (502). In addition, the system recommends potential receives for the resource (504). Details associated with the recommendation are shown in detail in FIG. 6. Following step (504) it is determined if there is a desired recipient of the resource in the system recommendation (506). A positive response to the determination at step (506) is followed by the owner of the resources selecting one or more desired recipients from the recommended list (508). Conversely, a negative response to the determination at step (506) is followed by the owner manually entering a desired recipient (510). Following either step (508) or (510) it is determined if all the desired recipients to access and share the source have been designated (512). A negative response to the determination at step (512) is followed by a return to step (502), and a positive response to the determination at step (512) concludes the recipient selection process (514). Accordingly, as shown herein recipient for the resource may be manually input or recommended.

Figure 6:
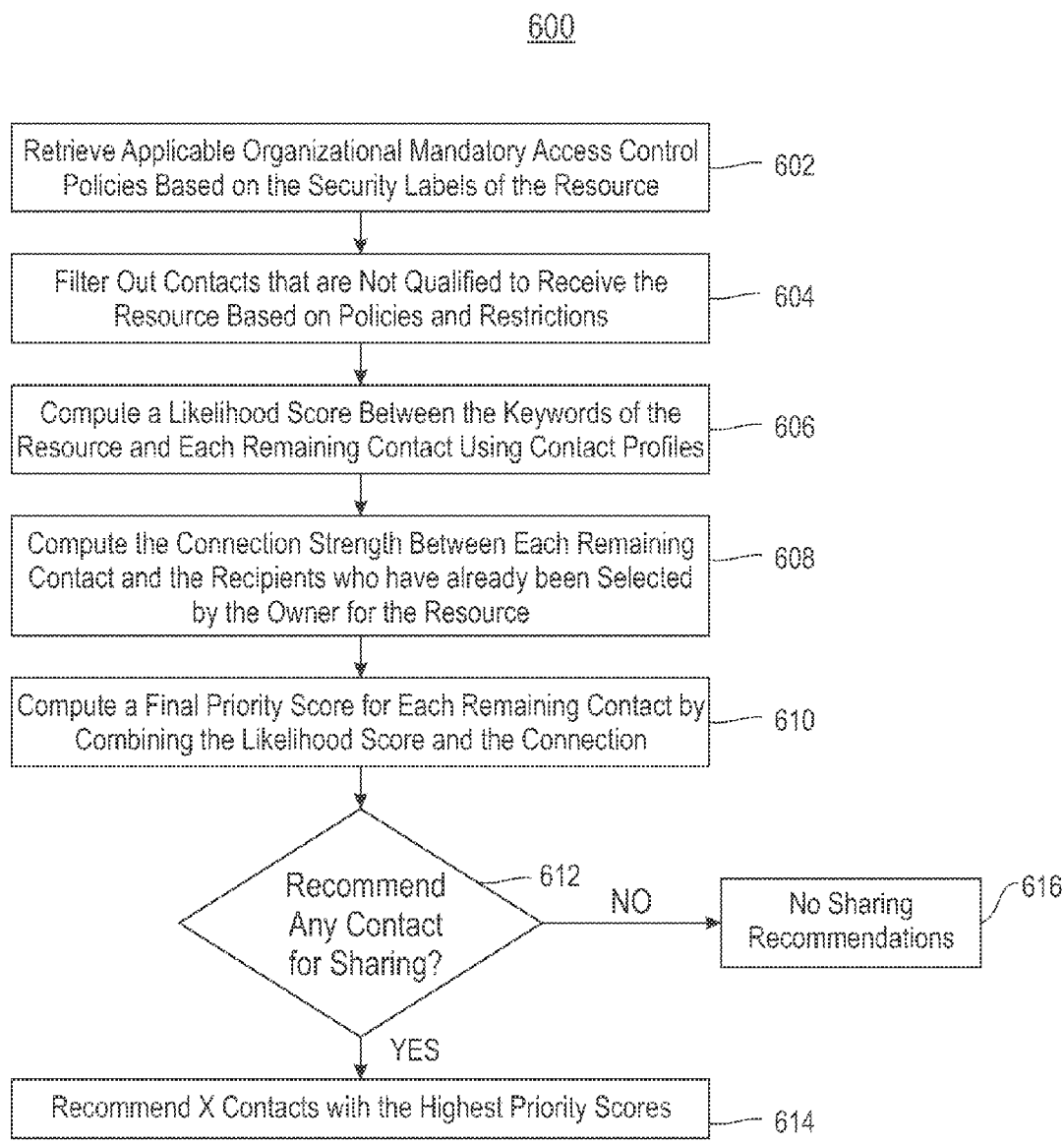
FIG. 6 depicts a flow chart illustrating providing recommendations for resources sharing among recipients.

In FIG. 5, one of the options for resource sharing is based upon recommendations provided by the system. See step (504). FIG. 6 is a flow chart (600) illustrating the process of the system providing recommendations for resource sharing among recipients. As noted earlier, one or more subsystems within the collaborative system employ an organization, within which there are tiers of management and associated employs. Mandatory access control policies are provided responsive to the hierarchy to employ security measures for resource sharing. In other words, different users at different levels of the hierarchy have different level of security clearance to access system resources. The aspect of providing recommendations for resource sharing is initiated with retrieving applicable organization mandatory access control policies based upon a security label associated with the resource (602). Details with respect to security labeling will be described below. Following step (602) a filter is applied to remove contacts within the organization that are not qualified to access the resource (604). In one embodiment, the removal is based upon security policies and restrictions within the organization. For example, the security level assigned with the resource does not include the security level of the contact within the organization. Accordingly, the first part of assessing recipient recommendation is based upon security protocols within a hierarchical description of an organization.

Following step (604), a likelihood score between keywords associated with the resource and contact profiles is computed as an element of the recommendation process (606). File sharing on collaboration systems is driven by real-world collaboration practices. A user's collaboration pattern includes parties they are working with, topic, places, etc. Collaboration patterns enable the system to determine likely recipients for files on certain topics. In one embodiment, contact profiles are created to store a user's collaboration patterns and feedback. Furthermore, in one embodiment, collaboration may stem from multiple subsystems, wherein each subsystem is searched to assess past and present collaboration activities. With respect to contact profiles, a profile is created for each contact, with each contact profile containing personal information, a preference tag, and a collaboration vector. The contact profile stores attribute information about a user's certain contact. For each user, a contact profile is create for each of the user's contacts, with the contact profile based upon the user's past collaboration activities with the contact. The personal information includes the contact name, email, and affiliation; the preference tag is set by past feedback of the user on the corresponding contact; and the collaboration vector stores a list of tuples, each of which consist of a keyword and a real-number weight with the keyword representing a collaboration topic. In one embodiment, the weight of the key word with a high value is characteristic of the importance of the contact with respect to the current topic. The following is a mathematical formula for computing the weight of the keyword:

$$g(t_l)\Sigma_{a_j \in A(u_i, t_l)} h(a_j)$$

where $g(t_l)$ is the weight of the keyword $t_l$, $h(a_j)$ is the importance of activity $a_j$, $A(u_i)$ is the set of collaboration activities in which $u_i$ is involved, and $A(u_i, t_l)$ is the subset of activities in $A(u_i)$ that are related to $t_l$. In one embodiment, if it is assumed that $a_j$ was performed k periods away from the current time; $h(a_j)$ may be computed as $\alpha^k$, where $\alpha$ in (0, 1) is a decay factor.

Once the profiles are created, they are maintained for future collaboration. To stay updated with collaboration information, the user's collaboration activities are monitored and integrated into a present set of contact profiles. More specifically, new profiles are created for new contacts and collaboration vectors are modified for existing contact profiles. For each existing contact, $u_i$, the weight of the keyword $t_l$ in its collaboration vector is updated based upon the following mathematical formula:

$$g_1(t_l) = g_0(t_l) \times \alpha + |A_1(u_i, t_l)|$$

where $g_0(t_l)$ is the old weight, $g_1(t_l)$ is the new weight, $\alpha \in [0, 1]$ is a decay factor, and $|A_1(u_i, t_l)|$ is the number of activities in $A_1$ that involve $u_i$ and contain $t_l$ as a keyword. Accordingly, by applying the decay factor, greater weight is given to recent activities with lesser weight given to past activities.

As shown at steps (404) and (408), security labels and keywords are associated with the resource and contact profiles, respectively, are employed as elements in the recommendation process. In addition, the strength of a connection between each remaining contact in the contact profiles and the recipients who have been selected to access and/or share the resource is computed (608). In one embodiment, a recipient is a contact to whom the owner has granted access to the file. By combining the computed likelihood score and the computed connection strength, a final priority score for each remaining contact is computed (610). Based upon a threshold setting, it is determined if any of the contacts may be recommended for sharing of the resource (612). In one embodiment, the threshold may be based upon the quantity of contacts to share the resource, a priority score associated with the computation at step (610), or a combination thereof. If any of the contacts meet the threshold setting, those contacts that at least meet the threshold are recommended for resource sharing (614). Conversely, if none of the contacts meet the threshold then no sharing recommendations are provided (616). Contact sharing is based upon a computational protocol associated with both keywords and the strength of social connections. Accordingly, when a user uploads a file, one or more contacts of the user may be recommended as a candidate recipient for the file based upon the computational protocol.

As described above, recommendations may be provided based upon attributes, based upon interaction, or a combination thereof. Attribute based recommendation is based upon created and stored contact profiles. Given a file f to be shared and a set of remaining contacts after qualification filtering, $C_q$, a list of suggested recipients is computed through assessment and prioritization. With respect to assessment, for each contact, $c_i \in C_q$ a likelihood score is computed between $c_i$ and f. In one embodiment, a higher score is indicative of approval for sharing. With respect to prioritization, the contacts are sorted in order of their likelihood score and a top set of recipients are returned. In one embodiment, the contacts are sorted in descending order. Similarly, in one embodiment, the quantity of recipients, x, may be a set value or a dynamically modifiable value. The following mathematical formula may be employed to compute a likelihood score, $d(c_i, f)$ between f and the contact $c_i$:

$$d(c_i,f) = \Sigma_{tj \in W_f} g(c_i, t_j) \times \log(\underline{|C|}/|Ct_j|) \times b(pt_i)$$

where $g(c_i, t_j)$ is the weight of the keyword $t_j$ in the contact's collaboration vector, $|C|$ is the total number of contacts for the user, $|Ct_j|$ is the number of contacts of the user whose collaboration vector contains the keyword tj, and $b(pt_i)$ is the adjustment value based on a preference tag $pt_i$ in the profile of $c_i$. The more important $c_i$ is with regards to the keywords in $W_f$, the larger $d(c_i, f)$. The degree of important between $c_i$ and a keyword is measured by $g(c_i, t_j)$.

Not all keywords in $W_f$ are equally effective in identifying contacts to be recommended for f. In one embodiment, keywords that are common place among a user's contacts are less effective than rare keywords. In a mathematical representation, the degree of commonality of a keyword $t_j$ is measured by $|C|/|Ct_j|$. As such, the more contacts having $t_j$ as a keyword will result in a small value of $|C|/|Ct_j|$. In one embodiment, the logarithm of $|C|/|Ct_j|$ is computed to mitigate the value from becoming dominant for rare keywords. In another embodiment, the opinion of the user with respect to the contacts is employed. More specifically, the value of the likelihood score may be adjusted based upon the preference tag $p_t$ in the profile of contact $c_i$. This adjustment promotes the user's preferred contacts in the recommendation list. In one embodiment, additional preference tags and adjustment values may be introduced. Accordingly, a user provided contact may be identified and a score adjustment may be applied to the identified contact in an effort to qualify the contact for collaboration recommendation.

As shown in FIG. 6, the recipient recommendation depends not only on the likelihood score between a contact and the target file, but also on the social connection strength between the contact and those recipients who have already been selected by the owner to receive the file. The connection strength may be derived from past collaboration activities among the contacts. The following formula may be used to compute the connection strength between contact $c_i$ and contact $c_j$:

$$p(c_j|c_i) = \Sigma_{x \ in \ A(i;j)} h(x) \Sigma_{y \ in \ A(i)} h(y)$$

where A(i) is the set of collaboration activities that include contact $c_i$ and A(i; j) is the set of collaboration activities that include both contacts $c_i$ and $c_j$. In one embodiment, if it is assumed that activity x was performed k periods away from the current time; h (x) may be computed as $\alpha^k$, where $\alpha$ in (0, 1) is a decay factor.

In the interactive recipient recommendation, the list of suggested recipients may change as the owner enters more and more recipients for the target file. The following formula may be used to compute the connection strength between a contact $c_i$ and a group of contacts R:

$$p(c_i|R) = \Pi_{cj \ in \ R} p(c_i|c_j)$$

where $p(c_j|c_i)$ is the connection strength between contact $c_i$ and contact $c_j$.

As shown in FIG. 6, the likelihood score and the connection strength of a contact are combined to acquire a final priority score for recipient recommendation. Let $d(c_i, f)$ be the likelihood score between $c_i$ and the target file f. Let $p(c_i|R)$ be the connection strength between $c_i$ and the set R of the recipients that have already been selected. The following formula may be used to combine $d(c_i, f)$ and $p(c_i|R)$ into a final priority score $s(c_i, f)$ of $c_i$ with regards to file f:

$$s(c_i, f) = \text{sqrt}(d(c_i, f) \times p(c_i|R))$$

As shown in FIG. 4, one of the steps for data leakage protection includes performing an abnormality check. See step (414). FIG. 7 is a flow chart (700) illustrating the process for evaluating a sharing violation together with an abnormality check. Specifically, each selected recipient is evaluated against mandatory access control policies of an organization (702). Based upon the evaluation, it is determined if any of the selected recipients violate any of the mandatory access control policies (704). A positive response to the determination at step (704) indicates failure and non-acceptance of the intended recipient for sharing of the resource (706). Conversely, a negative response to the determination at step (704) is followed by determining if any of the remaining selected recipients is an unlikely choice for sharing of the resource (708). In one embodiment, the abnormality check is considered a security check. Potential errors may arise in the recipient selection process, including but not limited to a typographical error when entering a recipient, an error in selection from a list of recipients, etc. Accordingly, the abnormality check is a process that reviews the recipient selection in view of the likelihood that granting access to an intended recipient may lead to leakage of data.

The goal of the abnormality check is to reduce errors in choice of recipients selected for sharing. More specifically, as shown at step (708) it is determined if any of the recipients have been determined to be unlikely. Details of the protocols associated with the determination at step (708) are shown and described in detail in FIG. 8. A negative response to the determination at step (708) is an indication that all of the recipients have passed the check process (710). Conversely, a positive response to the determination at step (708) is followed by a subsequent test to determine if the owner of the resource has elected to ignore a warning associated with one or more of the recipients (712). The purpose of the warning is to bring the possible error to the attention of the user and to provide an opportunity to make a correction. However, the warning is merely a warning and does not prevent the selection of the identified recipient(s). More specifically, the user may ignore the warning and select the identified recipient(s) for resource sharing. A positive response to the determination at step (712) is followed by the owner of the resource ignoring a warning pertaining to the recipient (714). However, a negative response to the determination at step (712) is an indication that the owner has accepted the warning, and is followed by a return to step (706). Accordingly, as demonstrated herein, the violation review includes both the organizational hierarchy and user input to determine violation of security protocols.

As shown in FIG. 7, a recommender solution may fail to suggest all the file recipients for collaboration. The user would have to manually insert each recipient that is missing in the recommendation list, and it is recognized that the manual input process may lead to an error. Each manually inserted recipient is examined in an effort to detect potential errors. For a set of manually entered recipients, $R_f$, the following examination policies are employed:

1. Let P be the set of applicable mandatory access policies. For every $c_i \in R_f$ if $c_i$ violates one or more policies in P, $c_i$ is removed from $C_r$.
2. For every $c_i \in R_f$ if a preference tag in the profile of $c_i$ has a preference tag indicating the request to receive an alarm when sharing a file, a warning is issued. In one embodiment, the warning is employed to prevent accidental sharing with a contact otherwise qualified to be a member of a collaboration.
3. For every $c_i \in R_f$ if the likelihood score of $c_i$ is in an identified percentile ranking among the score of the user's contacts C, then $c_i$ is marked as an abnormal recipient with an associated warning sent to the user. In one embodiment, the warning is employed to address a recipient with whom the user has never or rarely had collaboration.

Following receipt of a warning, the user is provided an opportunity to address the warnings, including provision to modify or correct the identified recipient(s). In one embodiment, each modified recipient will be evaluated. At the same time, the user may choose to ignore one or more warning messages. In one embodiment, the file will not be shared among collaborators until all of the warnings have either been addressed or ignored. Accordingly, the list of recipients is evaluated to search for and address abnormalities in the proposed file collaboration.

Figure 8:
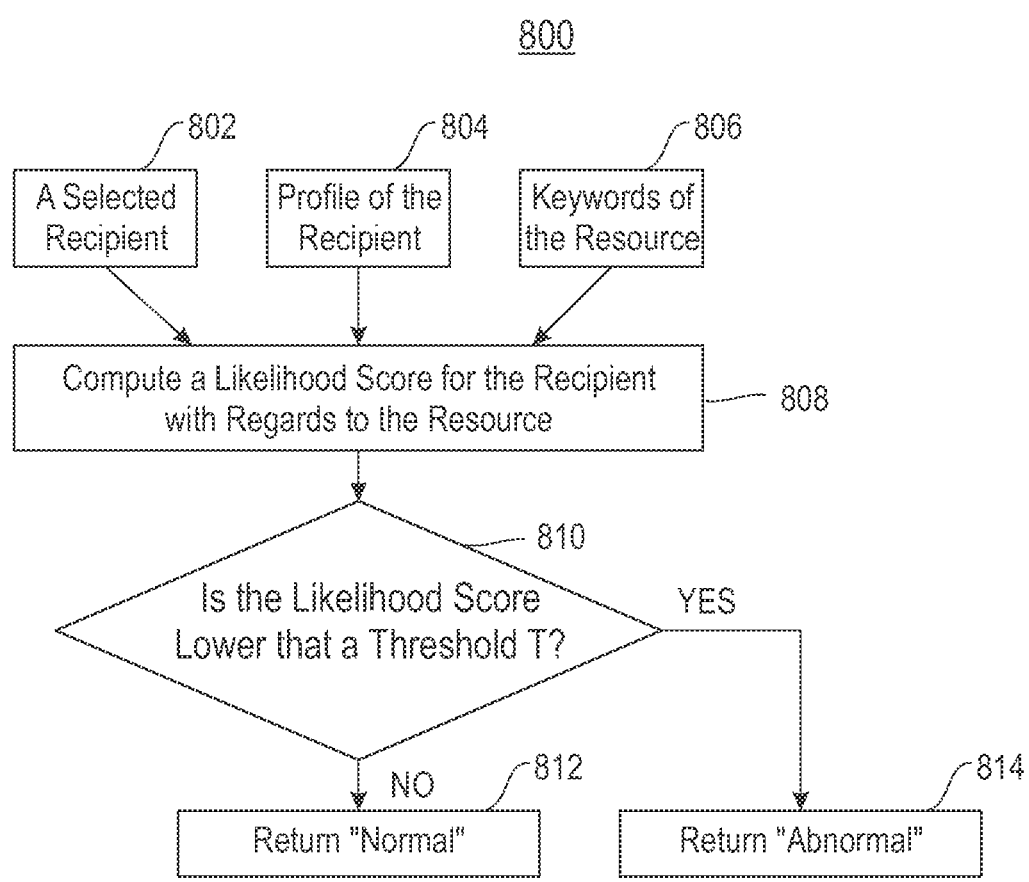
FIG. 8 depicts is a flow chart illustrating the process for determining detection of an unlikely sharing source.

As shown at step (708) of FIG. 7, it is determined if any of the remaining selected recipients is an unlikely choice for sharing of the resource. FIG. 8 is a flow chart (800) illustrating the process for determining detection of an unlikely sharing source. As shown, there are three elements that are employed as input in the detection process, including a selected recipient (802), a profile of the recipient (804), and keywords associated with the resource to be shared (806). Based upon the input, a likelihood score is calculated for the recipient(s) with respect to the resource (808). It is then determined if the score is lower than a threshold value (810). Details of the threshold value determination are described below in FIG. 9. In one embodiment, the determination at step (810) may be inverted so that the threshold comparison is based upon exceeding the threshold value. A negative response to the determination at step (810) returns a normal value (812) indicative of the recipient in question passing the security protocol. Conversely, a positive response to the determination at step (812) returns an abnormal value (814) indicative of the recipient in question failing the security protocol. Accordingly, a likelihood score may be computed and employed as an element for recipient selection.

Figure 9:
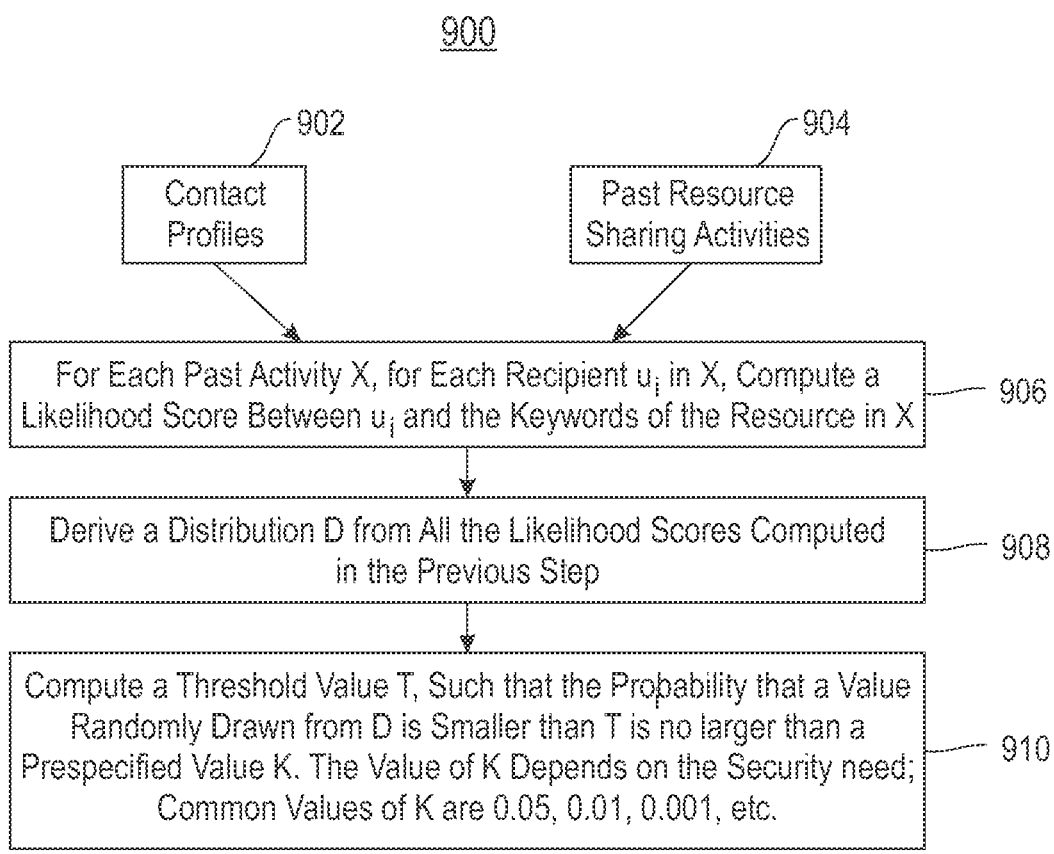
FIG. 9 depicts a flow chart illustrating a process for dynamically determining a threshold value based upon past and current activity in the collaboration system.

As described above with respect to step (810), a threshold element is employed for passing and failing security checks of recipients. FIG. 9 is a flow chart (900) illustrating a process for dynamically determining a threshold value based upon past and current activity in the collaboration system. Input is received from contact profiles (902) and past resource sharing activities (904). For each past activity and each recipient, a likelihood score is computed between the recipient and keywords of the resource in the past activity (906), and a distribution, D, is derived from the computed likelihood scores (908). Finally, a threshold value, T, is computed such that the probability that a value randomly drawn from D is smaller than T and is not larger than a pre-specified value, K (910). In one embodiment, the value of K depends on the security need. Accordingly, the aspect of determining a threshold is dynamic and employs past activity as a factor.

Figure 10:
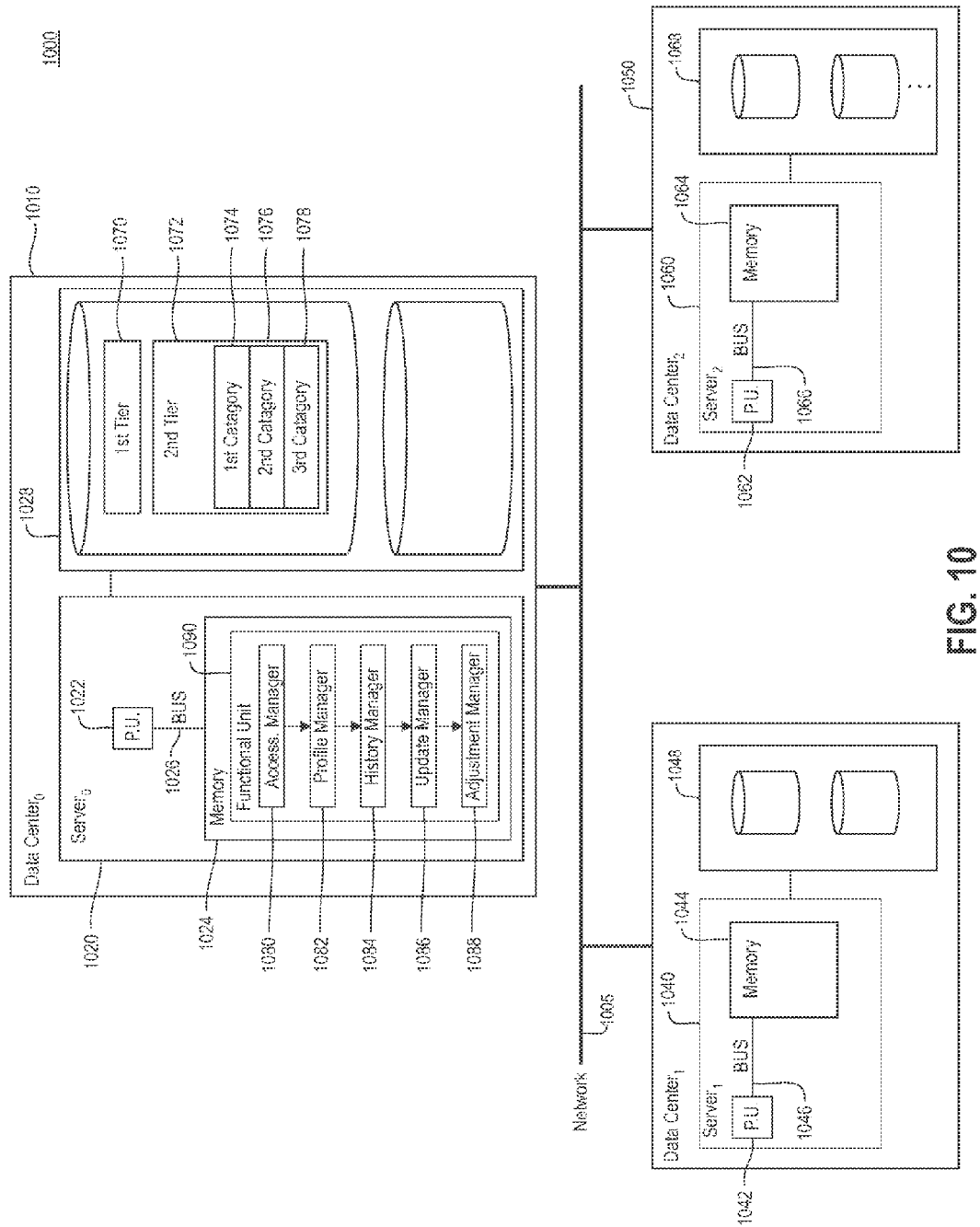
FIG. 10 depicts a block diagram illustrating tools embedded in a computer system to support leakage protection in a collaboration system employed within a shared group of resources.

As shown in FIGS. 1-9 and the associated formulas described above, a method is provided to mitigate data leakage in a collaboration system where mistakes with respect to leakage of sensitive information may arise. Data leakage is reduced with respect to inappropriate discretionary sharing decisions and mistakes by providing multiple layers of protection, including but not limited to, organization-level mandatory access control policies, attribute-based recipient recommendations, and abnormality detection. FIG. 10 is a block diagram (1000) illustrating tools embedded in a computer system to support leakage protection in a collaboration system employed within a shared group of resources. More specifically, a shared pool of configurable computer resources is shown with a first data center (1010), a second data center (1030), and a third data center (1050). Although three data centers are shown in the example herein, the invention should not be limited to this quantity of data centers in the computer system. Accordingly, one or more data centers may be employed to support collaboration and data leakage prevention.

Each of the data centers in the system is provided with at least one server in communication with data storage. More specifically, the first data center (1010) is provided with a server (1020) having a processing unit (1022), in communication with memory (1024) across a bus (1026), and in communication with first local storage (1028); the second data center (1030) is provided with a server (1040) having a processing unit (1042), in communication with memory (1044) across a bus (1046), and in communication with second local storage (1048); and the third data center (1050) is provided with a server (1060) having a processing unit (1062), in communication with memory (1064) across a bus (1066), and in communication with third local storage (1068). Both server (1020) and server (1040) may separately communicate with the third local storage (1068) across a network connection (1005).

In the a shared pool of configurable computer resources, including the first data center (1010), the second data center (1030), and the third data center (1050), one of more files may be shared. A functional unit (1090) is provided with one or more tools to support the aspect of managing access of a shared file. The tools include, but are not limited to, an access manager (1080), a profile manager (1082), a history manager (1084), an update manager (1086), and an adjustment manager (1088). The access manager (1080) is provided in the shared pool to manage access of a shared file. As shown herein, the access manager (1080) is local to the first data center (1010). The access manager (1080) is responsible for specifying both first and second tiers of mandatory access control policies to an entity owning data in the sharing environment. In one embodiment, and as shown herein, the first and second tiers (1070) and (1072), respectively, are provided local to the first local storage (1028). However, in another embodiment, the first and second tiers (1070) and (1072) may be in memory (1024). The first tier (1070) of the mandatory access control policies addresses control and maximum sharing scopes of certain types of files and places coarse grained security boundaries, i.e. restrictions, around discretionary sharing decisions made by users of resources. The second tier (1072) of the mandatory access control policies includes three subcategories as follows: a first category (1074) that is applicable to all files shared by the users, a second category (1076) that is applicable to sharing with respect to a specific file, and a third category (1078) that is applicable to re-sharing of a specific file. Accordingly, each of the first and second tiers (1070) and (1072) of the mandatory access control policies prevent leakage of data while maintaining a flexible discretionary control mechanism.

In addition to the access manager (1080), a profile manager (1082), a history manager (1084), an update manager (1086), and an adjustment manager (1088) are provided to support management of collaboration within the shared resource environment. More specifically, the profile manager (1082), which is in communication with the access manager (1080), functions to create an attribute profile for each entity contact, and the history manager (1084), which is in communication with the profile manager (1082) is provided to address past collaboration activity. More specifically, the history manager (1084) addresses the past activities as a basis for recommending one or more possible recipients for access to a target file. The update manager (1086), which is in communication with the history and profile manager (1084) and (1082), respectively, is provided to update contact profiles on a periodic basis. More specifically, the update reflects new collaboration information to maintain the profile in a current state. Accordingly, the profile manager (1082), history manager (1084), and update manager (1086) function to create and maintain the attribute profile for each entity in the collaboration environment.

The update manager (1086) and the adjustment manager (1088) are configured to address the dynamic nature of the collaboration environment. More specifically, the adjustment manager (1088), which is in communication with the update manager (1086), dynamically adjusts recommendations for the file sharing. The recommendations are based upon the updated contact profiles as maintained by the update manager (1086). In one embodiment, the adjustment manager (1088) detects user decision errors, which includes issuance of a warning for entry of an abnormal recipient selected for file sharing. As discussed above, the system functions in a dynamic manner to address the ever changing characteristics of a file sharing environment, which in itself is inherently dynamic. The update manager (1086) is configured to dynamically track user history of collaboration and communication, and to employ this dynamically changing history to interactively recommend a recipient to the user for file sharing. In one embodiment, the update manager (1086) generates a monitor report to prevent future sharing errors. Accordingly, the update and adjustment managers (1086) and (1088), respectively, address the dynamic nature of the file sharing environment through dynamic updates of contact profiles and adjustment of recommendations for file sharing in a dynamic manner and responds to any adjustments.

As identified above, the access, profile, history, update, and adjustment, (1080), (1082), (1084), (1086), and (1088), respectively, are shown residing in memory (1024) of the server (1020) local to the first data center (1010). Although in one embodiment, the access, profile, history, update, and adjustment, (1080), (1082), (1084), (1086), and (1088), respectively, may reside as hardware tools external to memory (1024) of server (1020), they may be implemented as a combination of hardware and software, or may reside local to memory of one of the other data centers (1030) and (1050) in the shared pool of resources. Similarly, in one embodiment, the managers may be combined into a single functional item that incorporates the functionality of the separate items. As shown herein, each of the manager(s) are shown local to one data center. However, in one embodiment they may be collectively or individually distributed across the shared pool of configurable computer resources and function as a unit to manage dynamic file sharing collaboration while mitigating data leakage. Accordingly, the managers may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
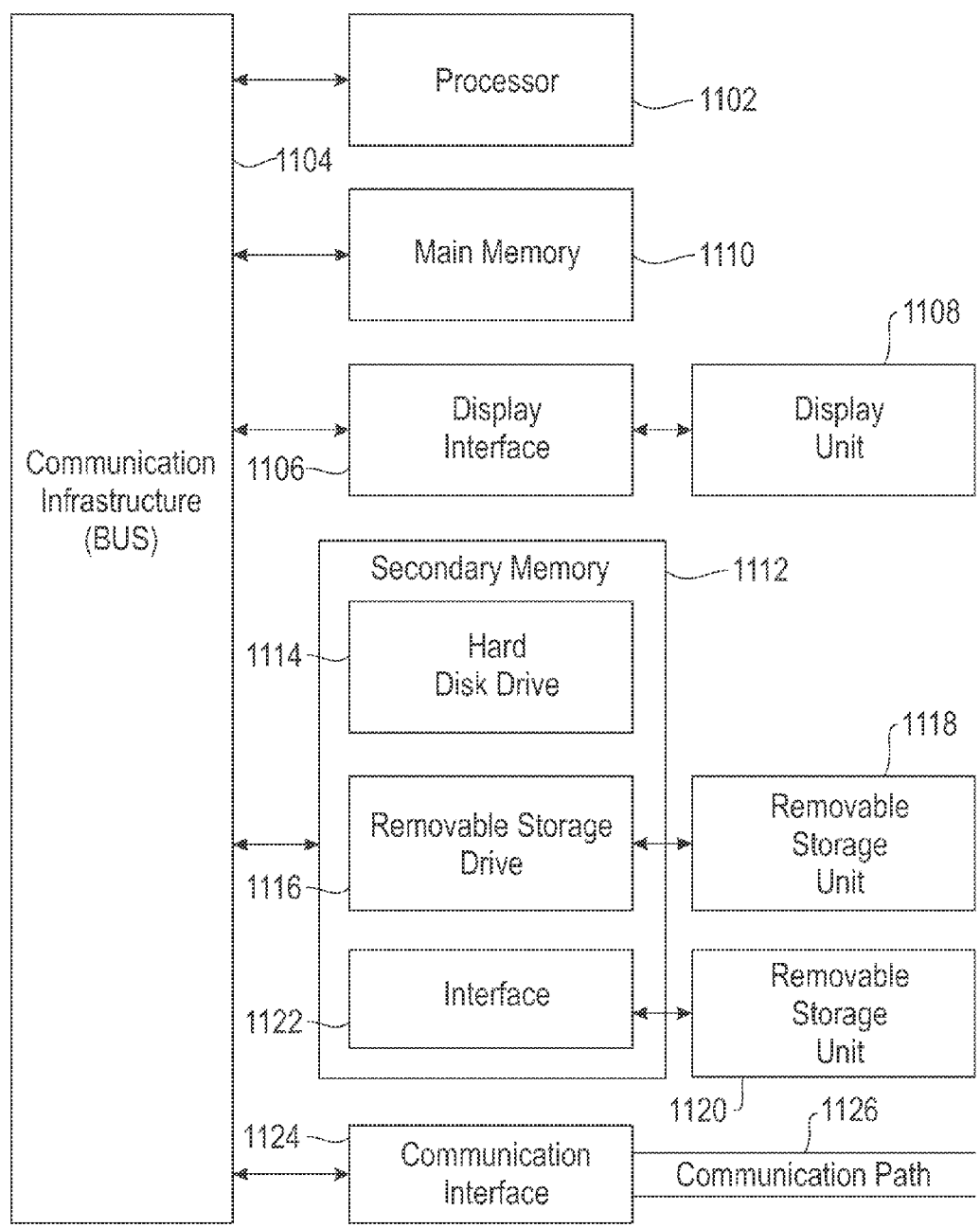
FIG. 11 depicts is a block diagram showing a system for implementing an embodiment of the present invention.

Referring now to FIG. 11 is a block diagram (1100) showing a system for implementing an embodiment of the present invention. The computer system includes one or more processors, such as a processor (1102). The processor (1102) is connected to a communication infrastructure (1104) (e.g., a communications bus, cross-over bar, or network). The computer system can include a display interface (1106) that forwards graphics, text, and other data from the communication infrastructure (1104) (or from a frame buffer not shown) for display on a display unit (1108). The computer system also includes a main memory (1110), preferably random access memory (RAM), and may also include a secondary memory (1112). The secondary memory (1112) may include, for example, a hard disk drive (1114) and/or a removable storage drive (1116), representing, for example, a floppy disk drive, a magnetic tape drive, or an optical disk drive. The removable storage drive (1116) reads from and/or writes to a removable storage unit (1118) in a manner well known to those having ordinary skill in the art. Removable storage unit (1118) represents, for example, a floppy disk, a compact disc, a magnetic tape, or an optical disk, etc., which is read by and written to by removable storage drive (1116). As will be appreciated, the removable storage unit (1118) includes a computer readable medium having stored therein computer software and/or data.

In alternative embodiments, the secondary memory (1112) may include other similar means for allowing computer programs or other instructions to be loaded into the computer system. Such means may include, for example, a removable storage unit (1120) and an interface (1122). Examples of such means may include a program package and package interface (such as that found in video game devices), a removable memory chip (such as an EPROM, or PROM) and associated socket, and other removable storage units (1120) and interfaces (1122) which allow software and data to be transferred from the removable storage unit (1120) to the computer system.

The computer system may also include a communications interface (1124). Communications interface (1124) allows software and data to be transferred between the computer system and external devices. Examples of communications interface (1124) may include a modem, a network interface (such as an Ethernet card), a communications port, or a PCMCIA slot and card, etc. Software and data transferred via communications interface (1124) are in the form of signals which may be, for example, electronic, electromagnetic, optical, or other signals capable of being received by communications interface (1124). These signals are provided to communications interface (1124) via a communications path (i.e., channel) (1126). This communications path (1126) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (1110) and secondary memory (1112), removable storage drive (1116), and a hard disk installed in hard disk drive (1114).

Computer programs (also called computer control logic) are stored in main memory (1110) and/or secondary memory (1112). Computer programs may also be received via a communication interface (1124). Such computer programs, when run, enable the computer system to perform the features of the present invention as discussed herein. In particular, the computer programs, when run, enable the processor (1102) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to application processing and disaster recovery, including, but not limited to, supporting separation of the location of the data from the application location and selection of an appropriate recovery site.

Alternative Embodiment

It will be appreciated that, although specific embodiments of the invention have been described herein for purposes of illustration, various modifications may be made without departing from the spirit and scope of the invention. In particular, the system can be configured to support leakage prevention in other elements within a computer system, including but not limited to, electronic mail communication. Accordingly, the scope of protection of this invention is limited only by the following claims and their equivalents.

We claim:

1. A method comprising:
   uploading, by an owning entity, a file to a file sharing environment including, a security label and a keyword associated with the file;
   specifying a first tier of a mandatory access control policy to the file based on the security label, the mandatory access control policy limiting sharing scope of the file and placing a restriction on an ability of the owning entity to share the file within the file sharing environment including limiting an ability to grant a second entity outside the restricted maximum sharing scope access to the file;
   generating a profile for an entity contact and storing the generated profile in memory, the profile including a collaboration vector comprising keywords representing collaboration topics between the owning entity and the entity contact, the keywords associated with a calculated weight;
   calculating a contact score for each entity contact defining relevance matching between the file and the entity contact, the contact score calculated based upon the weight of each keyword in the profile of the entity contact and the keywords associated with the file;
   interactively recommending a first entity contact within the limited sharing scope of the file to the owning entity as a candidate for file sharing based upon an associated contact score of the first entity contact;
   periodically updating the profile of each entity contact and the collaboration vector of each entity contact using new collaboration information; and
   interactively adjusting the recommendation for file sharing based on the updated contact profile, wherein the interactive adjustment includes an automated evaluation within the limited sharing scope of the file.

2. The method of claim 1 wherein the first tier of the mandatory access control policy may be defined by an affiliated organization of the entity, wherein the mandatory access control policy limits unauthorized sharing of one or more files by one or more entities.

3. The method of claim 1, further comprising a second tier of an access control policy to the file, the second tier including a first category applicable to each file shared by each entity, a second category applicable to sharing with respect to a specific file, and a third category applicable to re-sharing of the specific file.

4. The method of claim 1, further comprising:
   calculating a likelihood score between the keyword associated with the file and each contact;
   combining the likelihood score and the contact score for each contact including generating a priority score for each contact;
   prioritizing the priority scores; and
   wherein interactively recommending a contact of the entity as a recipient for file sharing is based upon the prioritized priority score.

5. The method of claim 1, wherein interactively recommending the first entity contact to the owning entity includes computing a connection strength between a candidate contact and each recipient that has already been chosen by the owner to share the file.

6. The method of claim 1, wherein the step of periodically updating the profile of each entity contact includes dynamically tracking user history, including updating user history based on file sharing decisions.

7. The method of claim 1, further comprising detecting a decision error, based on an error selected from the group consisting of: a security policy violation, and relevance between a contact profile and the keyword for the file to be shared.

8. The method of claim 1, further comprising generating a monitoring report to prevent future sharing errors.

9. The method of claim 1, wherein the collaboration vector comprises a real-number weight of a keyword, the collaboration vector differentiating a current activity from a past activity.

10. A computer program product comprising a computer readable hardware storage device having computer readable program code embodied therewith, the program code when executed on a processor causes the computer to:
    upload, by a first entity, a file to the file sharing environment including, a security label and a keyword associated with the file;
    specify a first tier of a mandatory access control policy to the file in the file sharing environment based on the security label, the mandatory access control policies to restrict a maximum sharing scope of the file and to place a security boundary on an ability of the first entity to share the file within the file sharing environment including, to limit an ability to grant a second entity outside the restricted maximum sharing scope access to the file;
    generate a profile for an entity contact, the profile including a collaboration vector comprising a keyword representing a collaboration topic between the first entity and the entity contact, the keyword associated with a calculated weight;

calculate a contact score for each entity contact defining relevance matching between the file and the first entity contact, the contact score calculated based upon the weight of the keyword in the profile of the entity contact and the keywords associated with the file;

recommend a first entity contact within the restricted maximum sharing scope to the first entity as a candidate to share the file, wherein the recommendation is based upon the contact score of the first entity contact;

periodically update the profile and the collaboration vector of each of the entity contact associated with the first entity using new collaboration information; and interactively adjust the recommendation for file sharing based on the updated contact profile, wherein the interactive adjustment includes an automated evaluation within the restricted maximum sharing scope.

11. The computer program product of claim 10, further comprising program code to specify a second tier of access control policies to the data, the second tier including: a first category applicable to all the files shared by each entity, a second category applicable to sharing with respect to a specific file, and a third category applicable to re-sharing of the specific file.

12. The computer program product of claim 10, wherein the program code to periodically update the profile includes instructions to dynamically track user history and employ the history to interactively recommend a recipient for file sharing.

13. The computer program product of claim 10, further comprising program code to detect a decision error, including issuance of a warning for an abnormal recipient selection.

14. The computer program product of claim 10, further comprising computer readable program code to generate a monitoring report to prevent a future sharing error.

15. A system comprising:

a file uploaded to a file sharing environment by a first entity, including a security label and a keyword associated with the file;

an access manager that is in communication with the file sharing environment, the access manager to specify a first tier of a mandatory access control policy to the file in the file sharing environment based on the security label, the mandatory access control policy to restrict maximum sharing scope of the file and to place a security boundary on an ability of the first entity to share the file within the file sharing environment including, to limit the ability to grant a second entity outside the restricted maximum sharing scope access to the file;

a profile manager in communication with the access manager, the profile manager to create an attribute profile for an entity contact, the profile including a collaboration vector comprising a keyword representing collaboration topics between the first entity and the entity contact, the keyword associated with a calculated weight;

a history manager in communication with the profile manager, the history manager to mine a past collaboration activity between the first entity and the entity contact;

a recommendation manager to calculate a contact score defining relevance matching between the file and the entity contact, the contact score calculated based upon the weight of the keyword in the profile of the entity contact and the keyword associated with the file, and to recommend a first entity contact within the restricted maximum sharing scope to the first entity as a candidate to share the file, wherein a recommendation is based upon the contact score of the first entity contact;

an update manager that is in communication with the history manager, the update manager to periodically update the profile of each entity contact and the collaboration vector of each entity contact, including using new collaboration information; and an adjustment manager in communication with the update manager, the adjustment manager to interactively adjust the recommendation for file sharing based on the updated contact profile, wherein the interactive adjustment includes an automated evaluation within the restricted maximum sharing scope.

16. The system of claim 15, further comprising the access manager to specify a second tier of the mandatory access control policy to the file, the second tier including: a first category within the second tier applicable to all files shared by the users within the file sharing environment, a second category within the second tier that is applicable to sharing with respect to a specific file, and a third category within the second tier that is applicable to re-sharing of a specific file.

17. The system of claim 15, further comprising the update manager to dynamically track user history and to employ the history to interactively recommend a recipient for file sharing.

18. The system of claim 15, further comprising the adjustment manager to detect a user decision error, including issuance of a warning for an abnormal recipient selection.

19. A method to support collaboration in an entity owning file sharing environment, the method comprising:

uploading, by a first entity, a file to a file sharing environment including, a security label and a keyword associated with the file;

specifying a first tier of a mandatory access control policy to the file based on the security label, the mandatory access control policy restricting a maximum sharing scope of the file and placing a restriction on an ability of the first entity to share the file including, to limit an ability to grant a second entity outside the restricted maximum sharing scope access to the file;

creating an attribute profile for an entity contact and storing the created attribute profile in memory, including mining a past collaboration activity, the profile including a collaboration vector comprising a keyword representing a collaboration topic between the first entity and the entity contact, the keyword associated with a calculated weight;

calculating a contact score for each entity contact defining relevance matching between the file and the entity contact, the contact score calculated based upon the weight of the keyword in the profile of the entity contact and the keyword associated with the file;

interactively recommending a first entity contact within the restricted maximum sharing scope to the first entity as a candidate for file sharing based upon an associated contact score;

updating a contact profile and the collaboration vector of each entity contact using new collaboration information on a periodic basis; and interactively adjusting the recommendation for file sharing based on the updated contact profile, wherein the interactive adjustment includes an automated evaluation within the restricted maximum sharing scope.

20. The method of claim 19, further comprising dynamically tracking a past collaborative activity in a shared pool of resources, and based upon the past activity recommending a recipient for a current collaborative activity in the shared pool.

* * * * *